Jan. 23, 1973  U. D. POLLY  3,712,839
APPARATUS FOR MAKING PLASTIC ARTICLES
Original Filed June 27, 1969  12 Sheets-Sheet 1

INVENTOR
UHEL D. POLLY

BY Schellin & Hoffman
ATTORNEYS

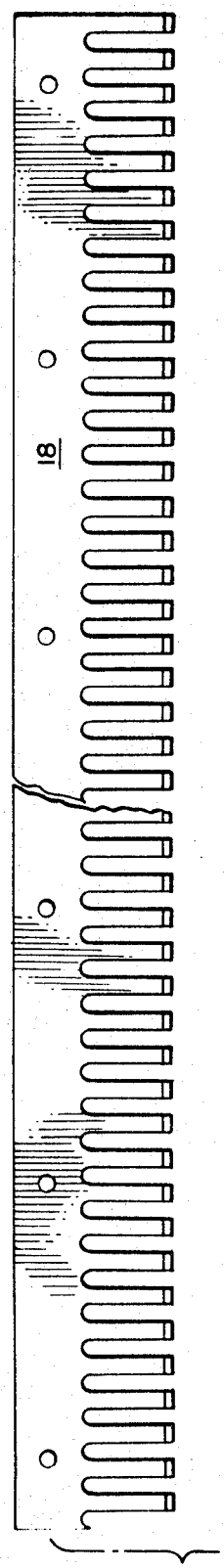
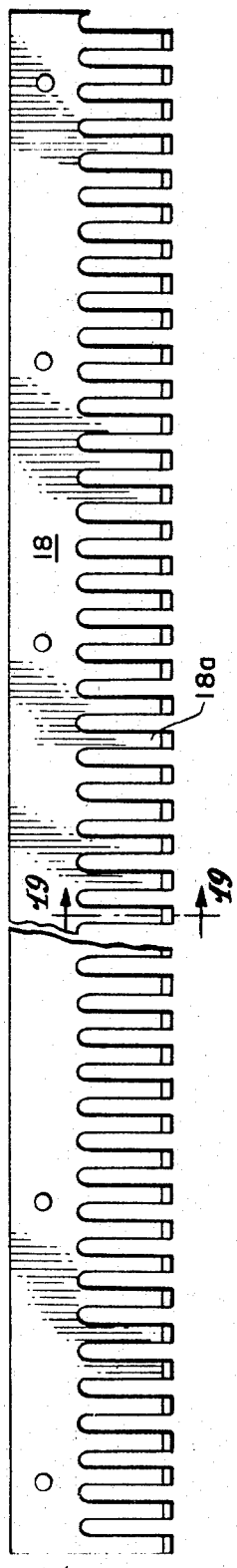
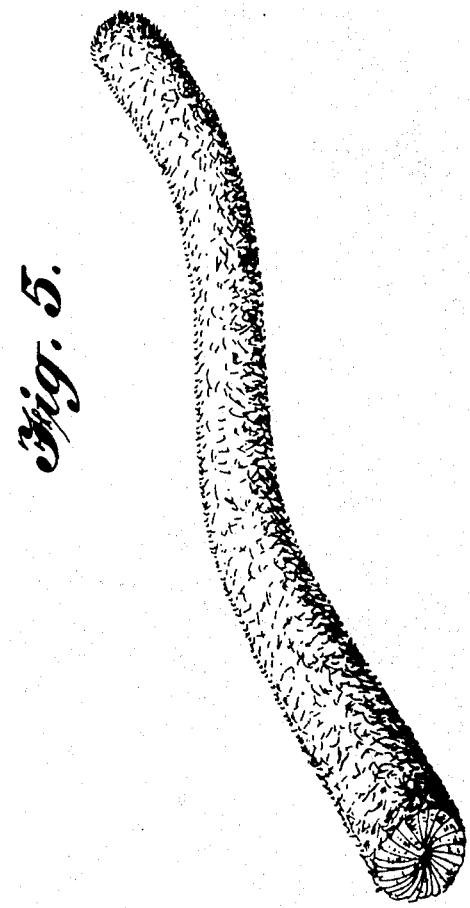
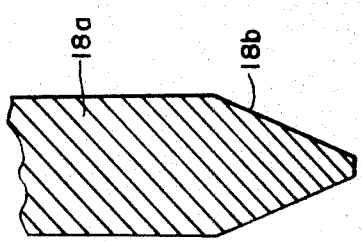

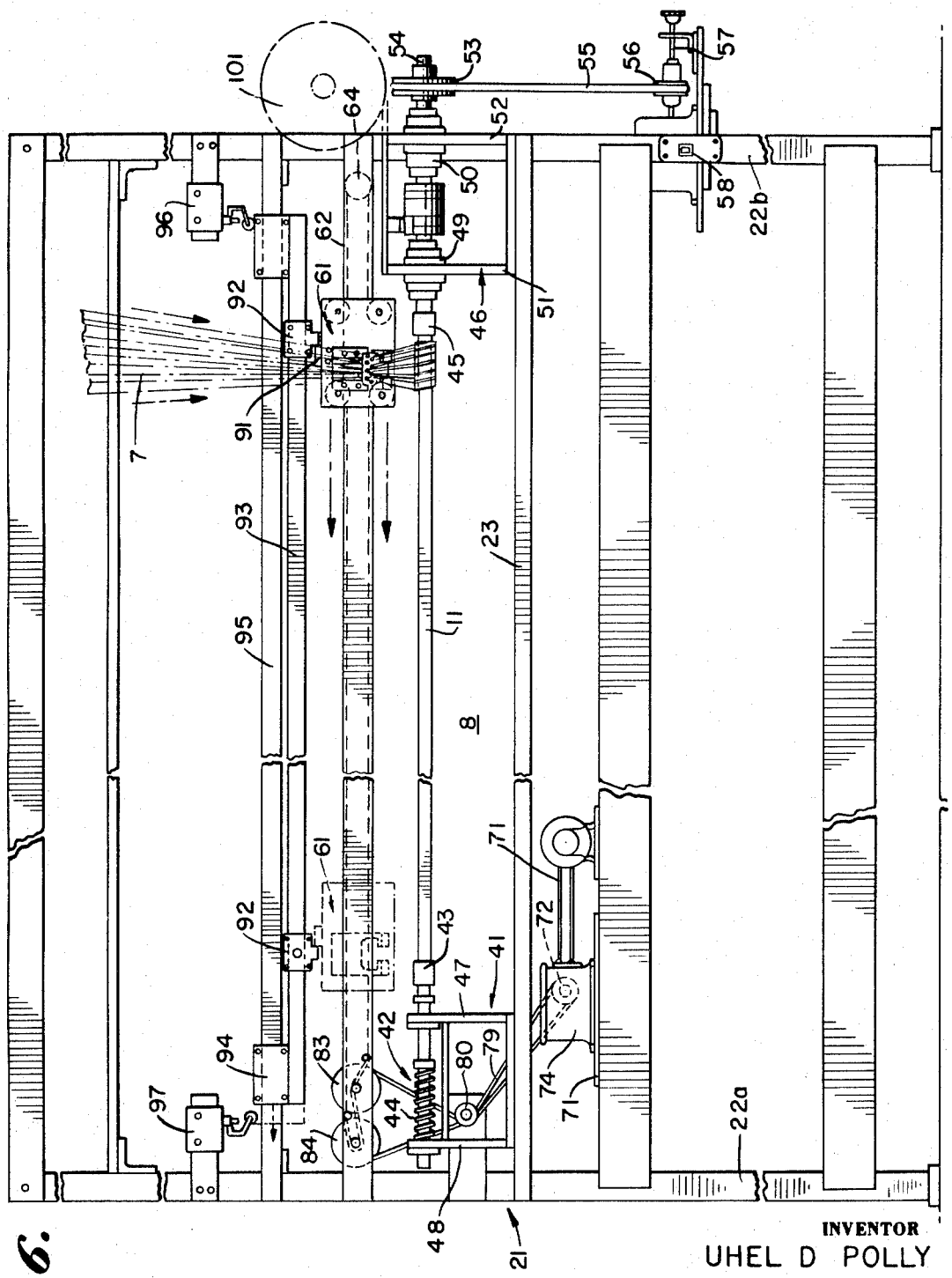

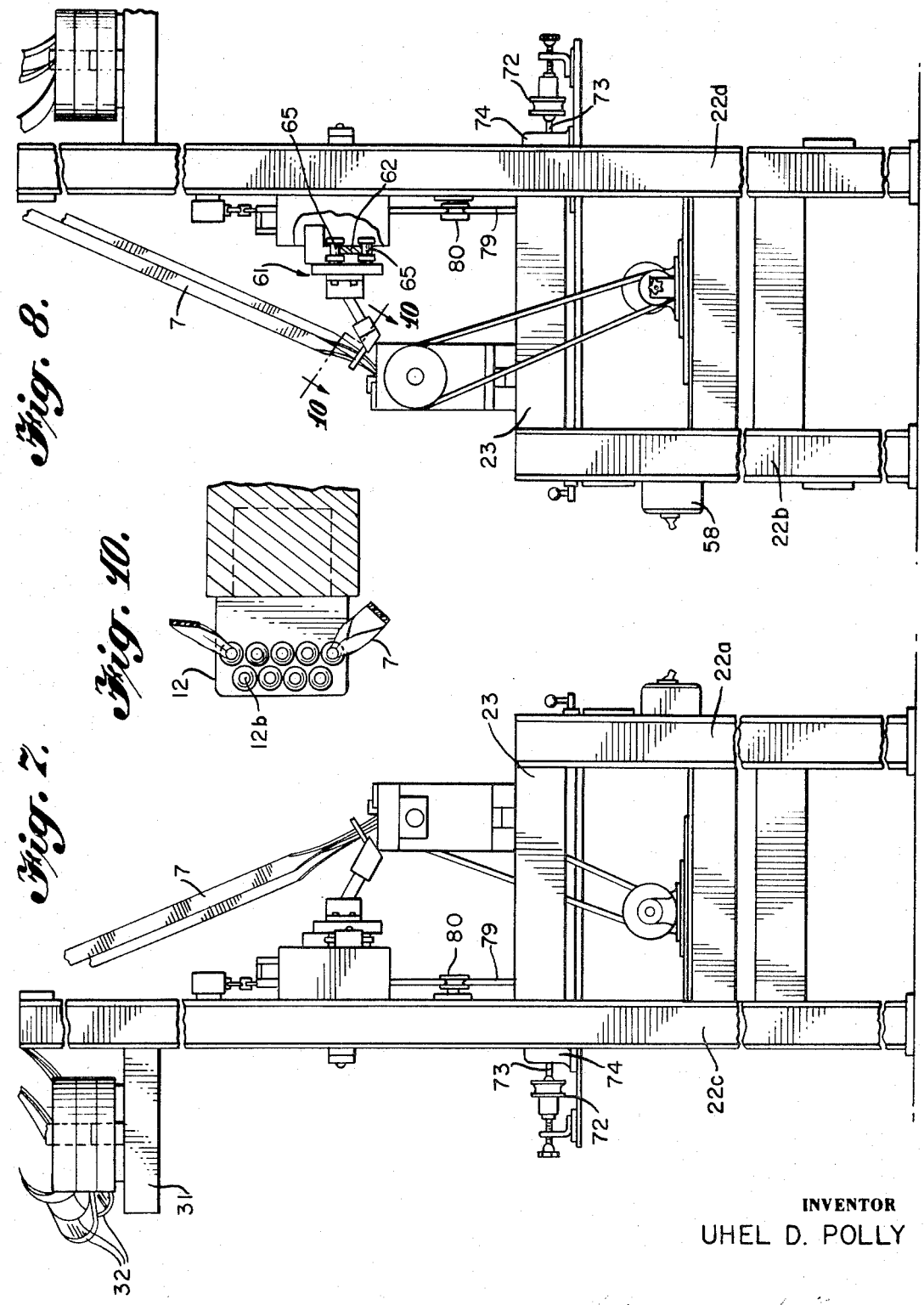

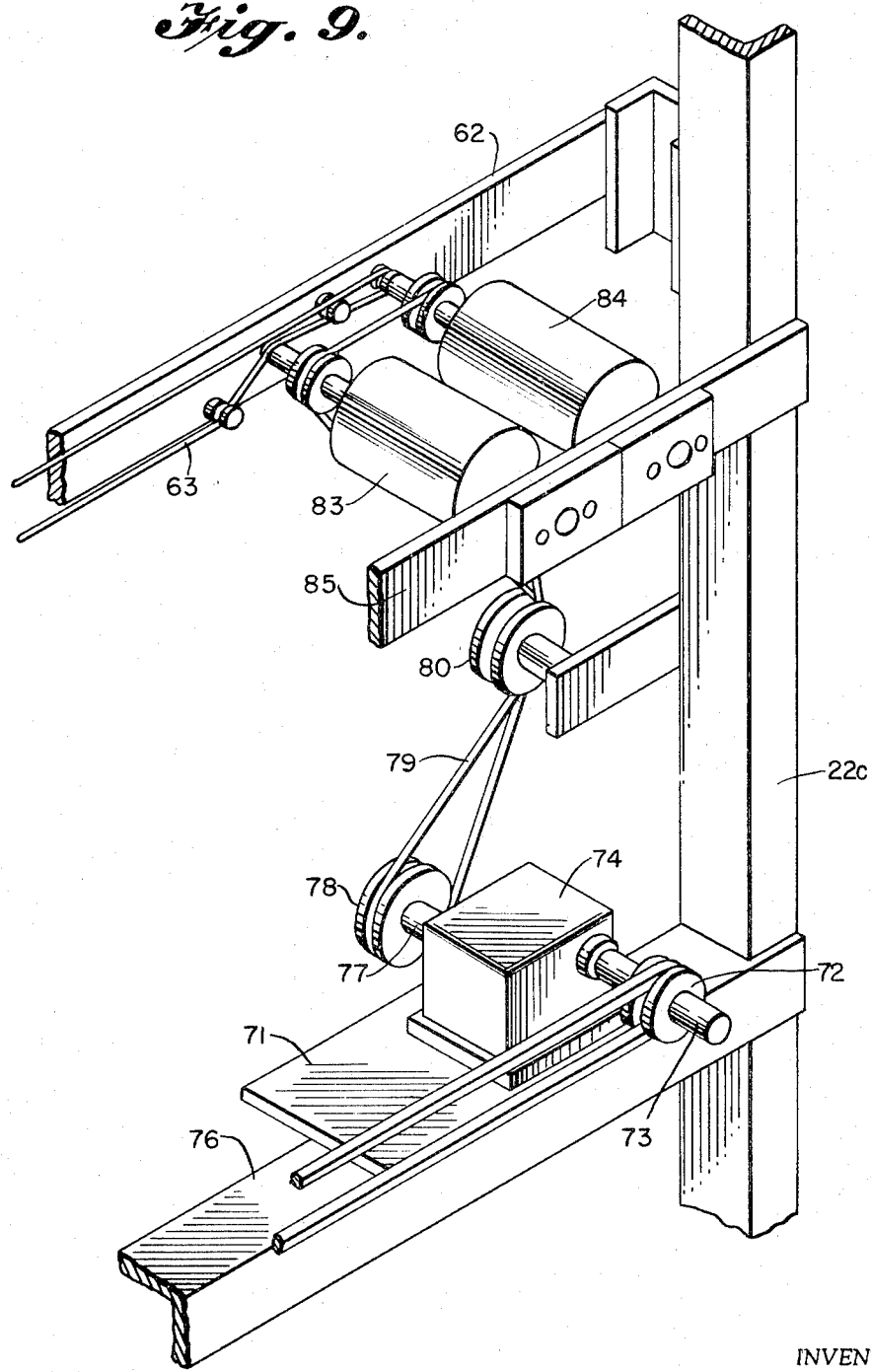

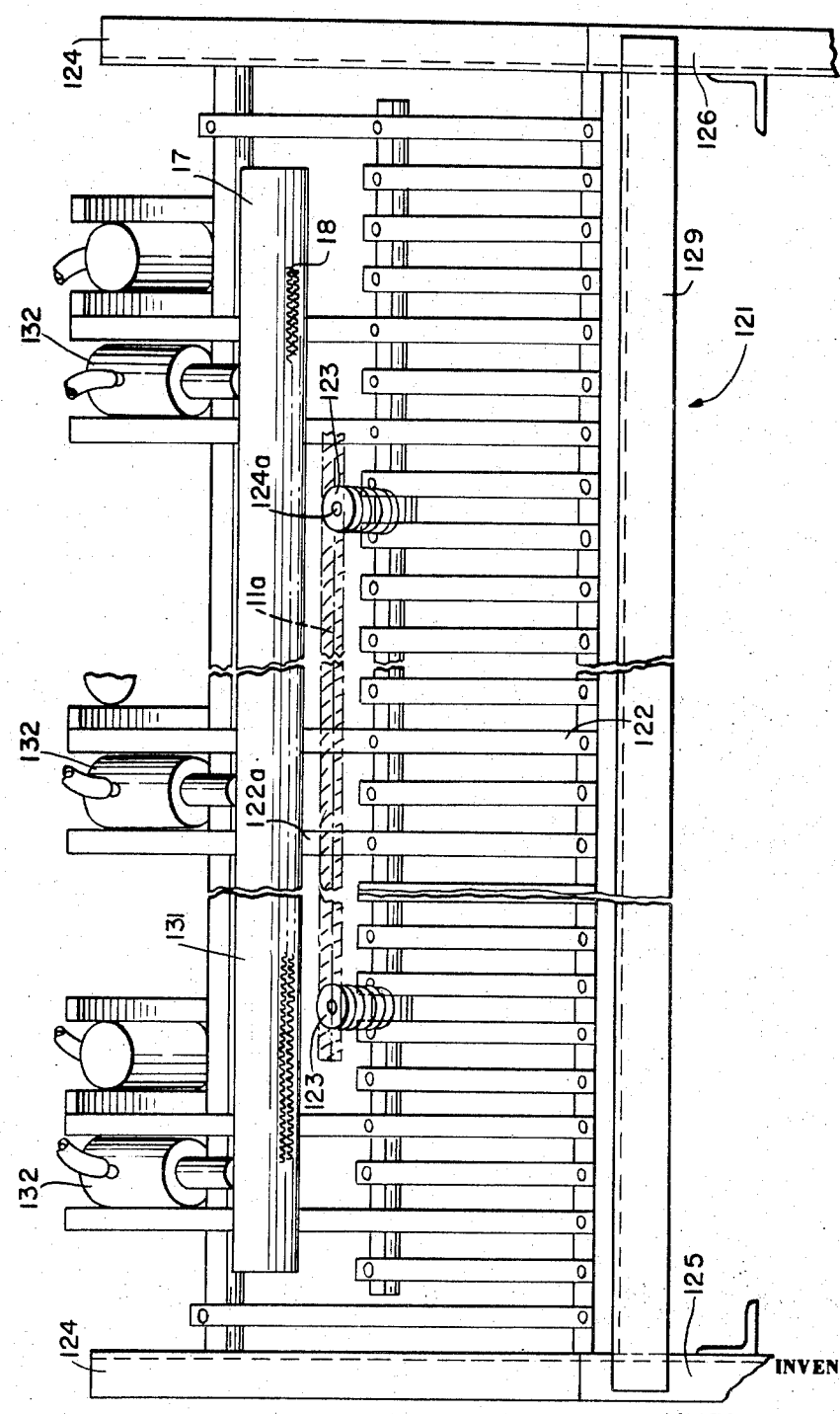

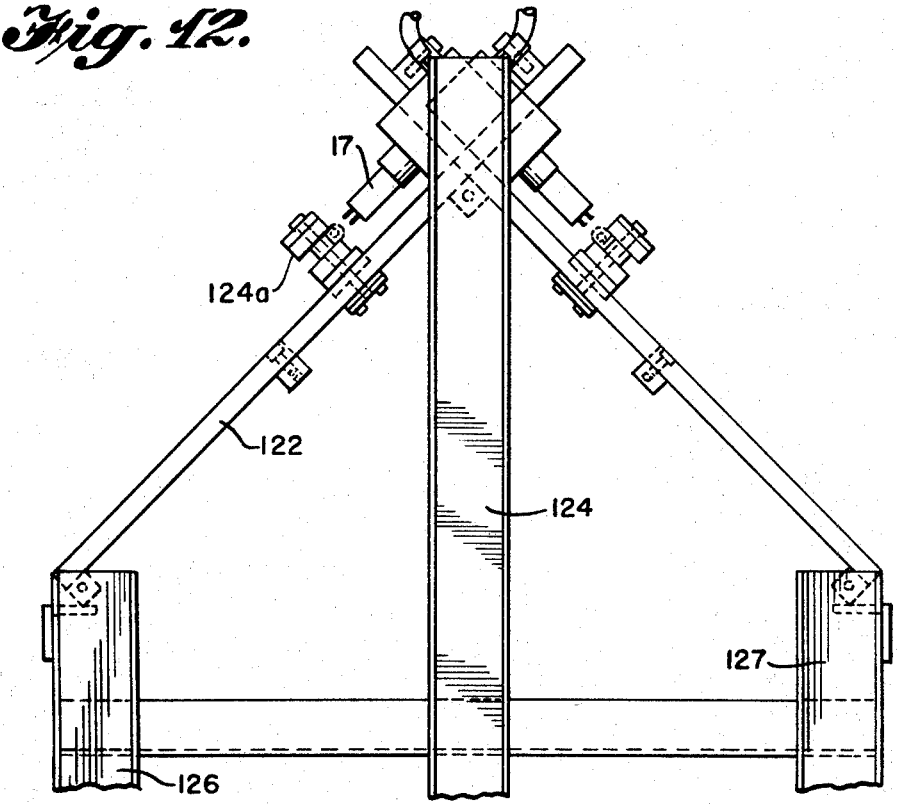
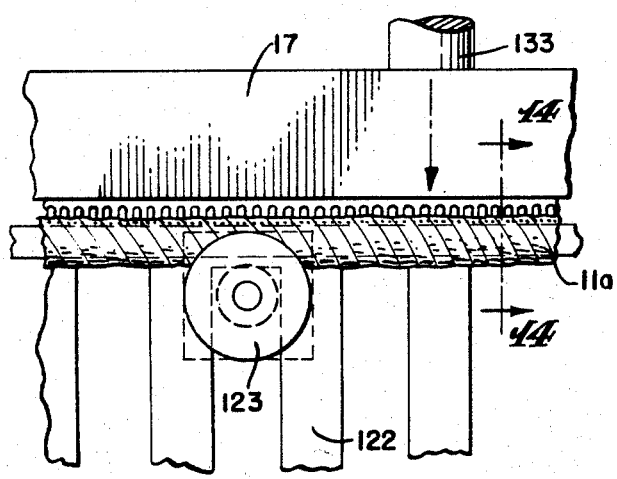
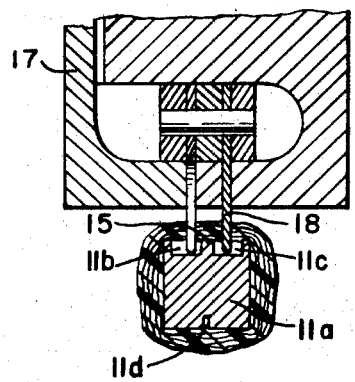

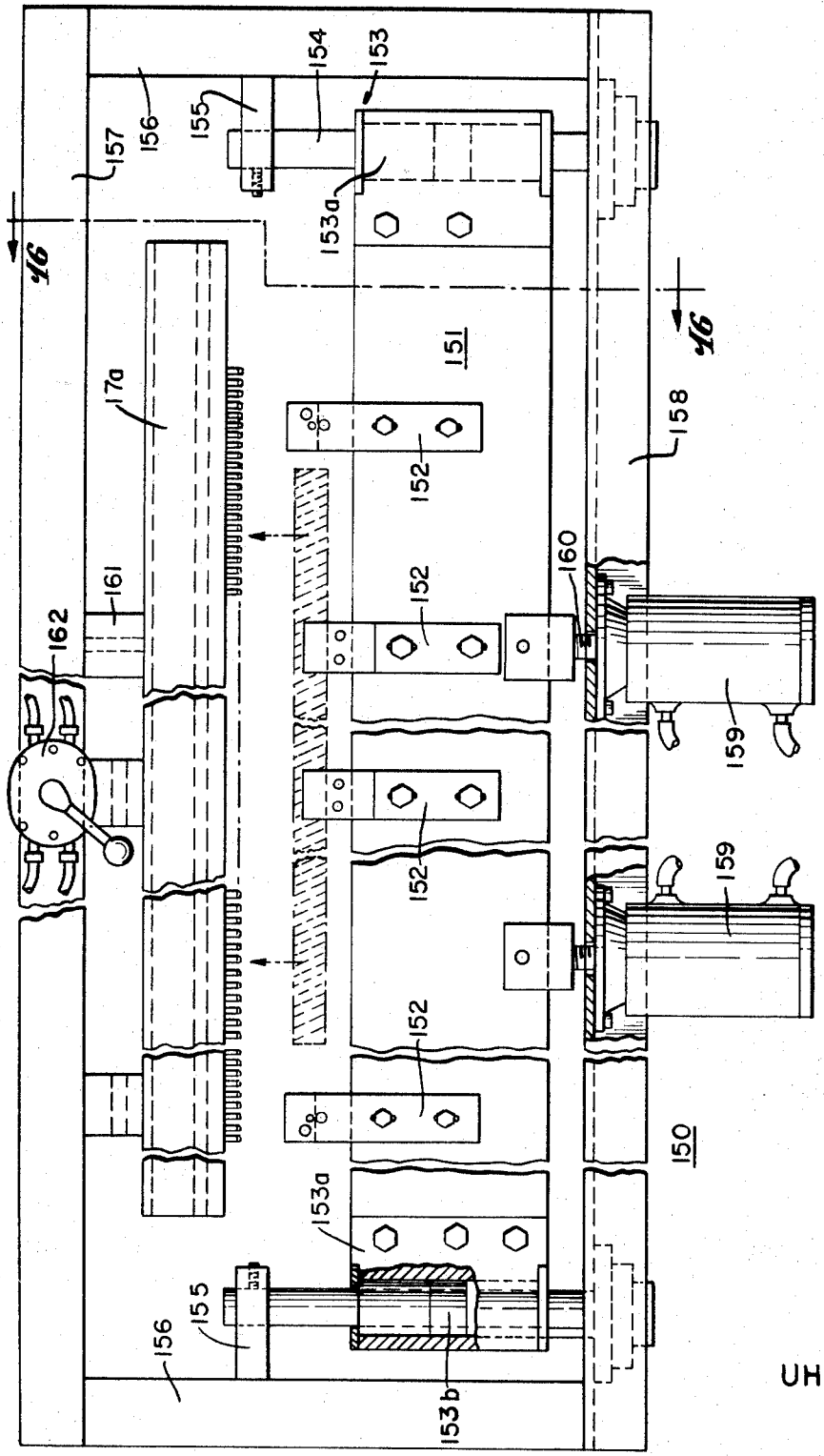

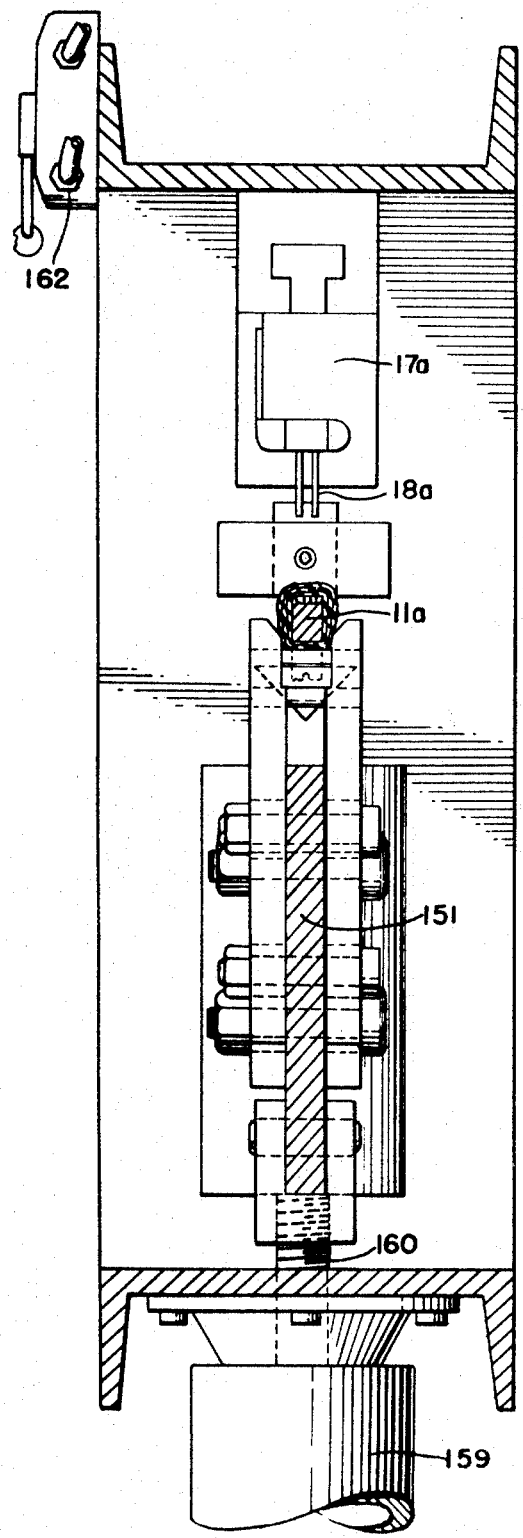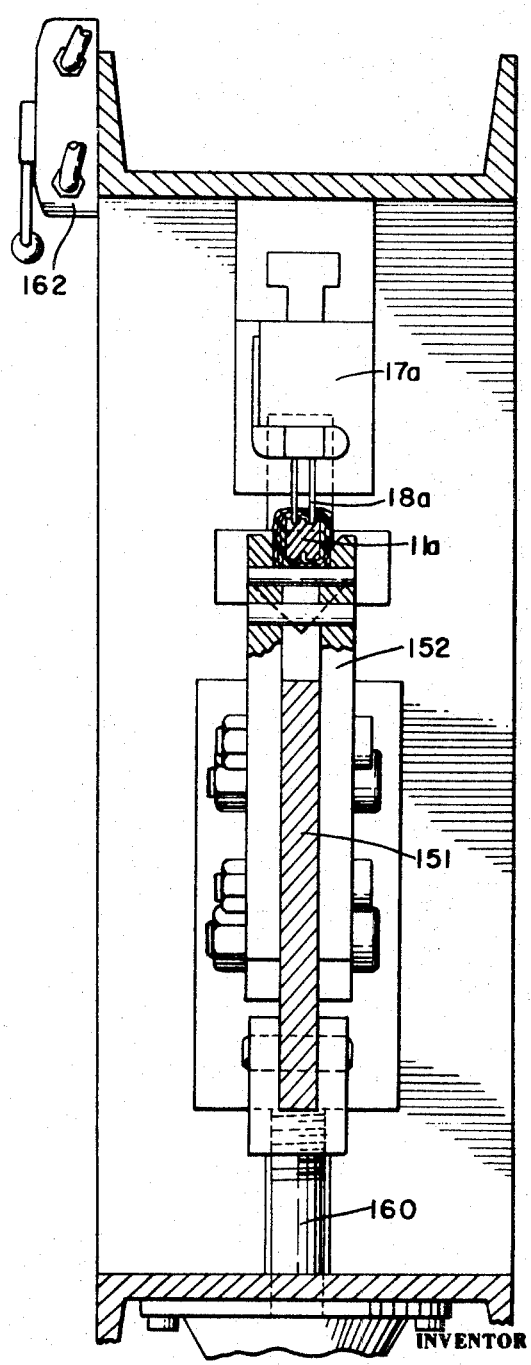

INVENTOR
UHEL D. POLLY

INVENTOR
UHEL D. POLLY

Jan. 23, 1973  U. D. POLLY  3,712,839
APPARATUS FOR MAKING PLASTIC ARTICLES
Original Filed June 27, 1969  12 Sheets-Sheet 12

INVENTOR.
UHEL D. POLLY
BY
ATTORNEYS

3,712,839
APPARATUS FOR MAKING PLASTIC ARTICLES

Uhel D. Polly, Margate, Fla., assignor to Consolidated Productions Incorporated, Fort Lauderdale, Fla.
Division of application Ser. No. 837,010, June 27, 1969, now Patent No. 3,589,970, dated June 29, 1971, and continuation-in-part of application Ser. No. 439,733, Mar. 15, 1965. This application June 19, 1970, Ser. No. 59,806

Int. Cl. B65h 81/04
U.S. Cl. 156—427                        2 Claims

ABSTRACT OF THE DISCLOSURE

A method and apparatus for manufacturing plastic articles which consists of twisting a relatively flat strip of plastic so that it is helical in shape, winding the plastic in flattened layers on a holder, sealing the layers together while the twisted plastic remains on the holder, adding reinforcing means to the plastic, if desired, while it remains on the holder and passing a cutting element through the plastic in a direction longitudinally along the holder. The flared resultant may then be utilized to create attractive objects.

---

This is a division of application Ser. No. 837,010, filed June 27, 1969, now Pat. No. 3,589,970, granted June 29, 1971 and a continuation-in-part application of application Ser. No. 439,733, filed Mar. 15, 1965, entitled: "Method for Making Plastic Articles," now Pat. No. 3,459,614, granted Aug. 5, 1969.

BACKGROUND OF THE INVENTION

The primary back ground of the present invention will be found in the above identified application. In other words, prior to the advent of the instant matter, there was no valid prior background. The ornamental materials of the type formerly employed and which are still employed were constructed of crepe paper using a gluing technique. Garlands manufactured from crepe paper are difficult to construct due to the inordinant amount of gluing necessary and have little or no properties to withstand water. Even when thermoplastic film material, such as polyethylene, is substituted for the crepe paper one does not obtain an attractive ornamental structure due to the fact that the polyethylene film, unless modified, does not present the crinkled effect commonly associated with crepe paper. The present inventions ingeniously brought forth herein and in the prior filed copending application include the utilization of a thermoplastic film strips, but by putting in a longitudinal twist into the film strip and using heat sealing techniques a garland is produced which is both extremely ornamental, useful and is less subject to destruction than any heretofore crepe praper type garland.

In the forepart, mention has been made of the utilization of garlands and the like. This is really only illustrative of the use of such ornamental materials available as the result of practicing the present invention. Actually, the invention can be practiced so that an enormous variety of objects may be constructed really only limited by the imagination of the individual employing the resultants. For instance, in the specification which follows mention is made that snakes may be produced, Christmas trees may be fabricated and a rug-like item may also be produced along with rigid and flexible garlands having a tubular configuration. When a wire reinforcing element (may also be termed a stiffening element) is employed in the center of the object of the present invention the longitudinal article may be bent into various configurations which then retain that desired shape by bending. For instance, it is possible to construct from a number of pieces an item such as a dog. The body, head and neck of the dog comprises a portion of the resultant article of the present invention which has a wire reinforcing element. The neck and head is constructed by bending the forward portion to form same. Legs are constructed by taking two pieces of wire reinforced portions and bending them into two U-shaped configurations. The apex portion of each unit is attached to the front and rear respectively of the body portion of the formed dog, such as by stapling and the like. Additional items may be attached to the dog to provide a more realistic animal, such as positioning button eyes in the head, a tongue consisting of a strip of polyethylene film may be stapled to the forepart of the snout and a tail consisting of thermoplastic film also in strip form may be attached to the rear by stapling and the like. The resultant is a colorful ornamental object having dog-like configuration.

It is also possible to construct, for instance, a pompom where the wire reinforced resultant article of the present invention is cut in a particular way, more about which will be mentioned later. As stated, the article employed in the production of the pompom has reinforcing wire so that it may be looped into a circle or oval thereby giving the configuration of a pompom.

BRIEF DESCRIPTION OF THE DRAWINGS

FIG. 5 shows a perspective view of the flared article resulting after the fourth step of the present invention.

FIG. 6 is a front elevation of a machine for carrying out the first and second steps of the present invention.

FIG. 7 is a left side view of the machine shown in FIG. 6.

FIG. 8 is the right side view of the machine of FIG. 5.

FIG. 9 is a rear view of the left side of a portion of the machine shown in FIG. 6.

FIG. 10 is a top view of the guide plate for guiding thermoplastic strips used in the machine of FIG. 6.

FIG. 11 is a front elevational view of the apparatus utilized in carrying out the third step as shown in FIG. 3.

FIG. 12 is the right hand side elevational view of the apparatus of FIG. 11.

FIG. 13 is a portion of a front elevational view of the apparatus of FIG. 11 showing the apparatus in use.

FIG. 14 is a cross-sectional view taken along lines 14—14 of FIG. 13.

FIG. 15 is a front elevational view of another embodiment for carrying out the third step as shown in FIG. 3.

FIG. 16 is a cross-sectional view taken along line 16—16 of FIG. 15.

FIG. 17 is also a cross-sectional view taken along line 16—16 of FIG. 15 showing the apparatus of FIG. 15 in use.

FIG. 18 shows front views of an exploded puncturing and heat sealing element utilized in the apparatus of FIGS. 15 and 11.

FIG. 19 is an enlarged view of a portion of a tooth utilized in the heating and puncturing element of FIG. 18.

As was stated in the above the inventive concept can be divided into four main categories with species, that is, a plurality of embodiments within the purview of each category. Best exemplified by the four mentioned categories are the four figures identified as FIGS. 1–4. In FIG. 1, a mandrel 11 is wound with a plurality of flattened twisted thin thermoplastic tapes 7. FIG. 1 shows the winding operation at near its inception. The mandrel 11 of this embodiment has a general rectangular cross-sectional configuration with two longitudinal slots, shown by reference numerals 11b and 11c, on the top surface thereof and a single longitudinal slot 11d along the bottom thereof. A guide plate means 12, which is mounted on a longitudinally moving carriage 61 (not fully shown here) guides the thermoplastic strips to the mandrel. The thermoplastic material is helically wound onto the mandrel in a manner so that the wound material is in a partial overlapping condition. By winding a plurality of strips at the same time it is possible to rotate the mandrel at a relatively slow rate while applying a large total quantity of the plastic material thereby obtaining many layers of said thermoplastic material. Actually in practice the mandrel is rotated quite rapidly. On the other hand, not excluded from the purview of the instant concept is the fact that a single twisted thermoplastic strip may be applied at a time. In such an instance it would be necessary to rotate the mandrel at an even faster rate while slowly moving the carriage longitudinally. The net result would be approximately the same. When only a single twisted strip is applied at a time it will be desirable to make several back and forth passes in an effort to get a sufficient quantity of twisted strip material.

Figure 1:
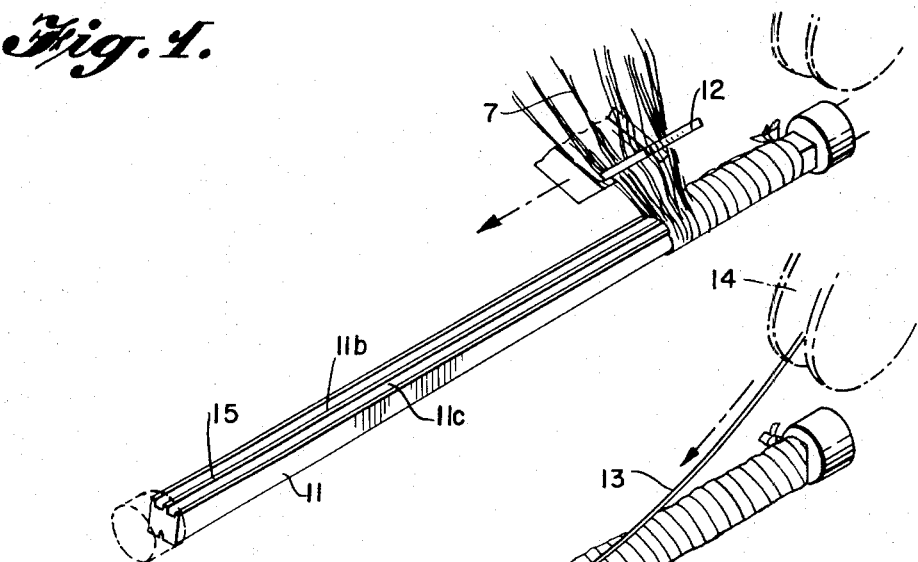
FIG. 1 is a perspective view of an initial step in fabricating the article of the present invention.
Figure 2:
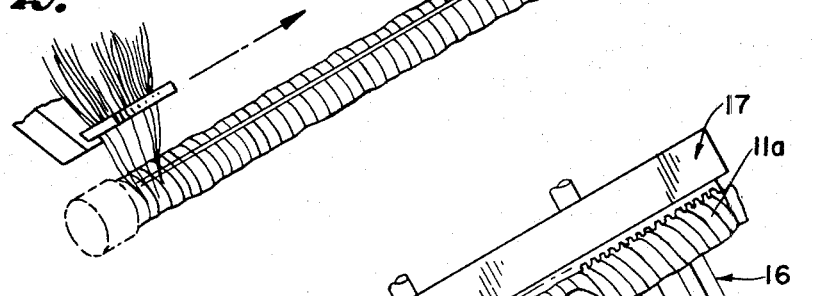
FIG. 2 is a perspective view of the second step of the present invention, when it is included.

After the carriage has moved to the opposite end of the mandrel while guiding the thermoplastic strips to the mandrel, the carriage is stopped and the rotating mandrel also ceases rotation. At this point, as shown in FIG. 2, it may be found desirable to incorporate a reinforcing element which may take the form of a number of different materials. One of the materials may be a wire, another material may be a thin relatively narrow reinforcing band of a plastic material having reinforcing elements therein such as fiberglass and the like. When a reinforcing element is employed the mandrel 11 must be stopped so that it is in the position as shown in FIG. 1 which presents the said longitudinal two slots at the upper surface. The reinforcing element 13 is played from a spool 14, for instance, so that it is laid on top of the round thermoplastic material in a manner so that it lies directly over the center ridge 15 between the two slots of mandrel 11. The reinforcing element 13 is cut so that it has approximately the same length as the mandrel or at least covers adequately the wound thermoplastic material which is about the mandrel. When the reinforcing element has been positioned, when such is applied, the mandrel is set into rotation again as before and the carriage carrying the strips of twisted thermoplastic material returns to the right to its original position and thereby encompasses by helically winding thermoplastic strips, the previously positioned reinforcing element 13. At this juncture the tapes are severed from the supply at or near the guide late 12 and are further secured by conventional means such as affixing a transient tape having pressure sensitive adhesive thereon.

Figure 3:
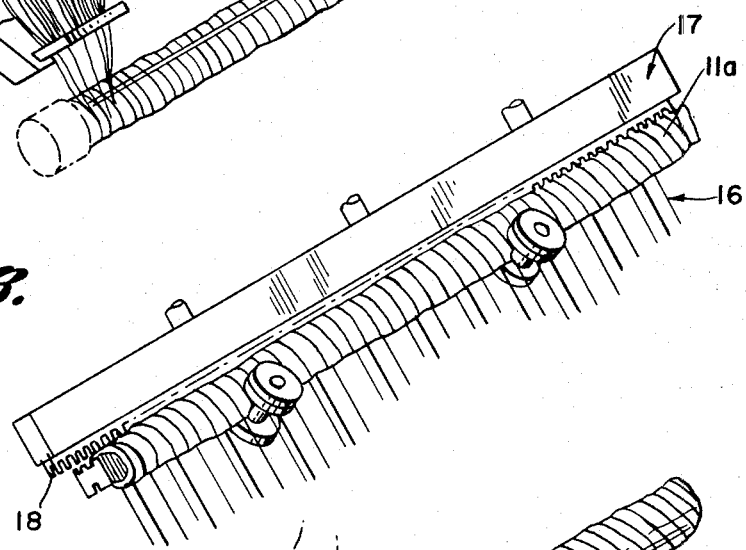
FIG. 3 illustrates a perspective view of the third step of the present invention.

When the mandrel has been sufficiently wound as desired, more about this will be mentioned later, it is then transferred to an apparatus for effecting the third step which includes a holder means 15 and a puncturing and heat sealing means 17. Of course, if the mentioned apparatus is in direct association with the rotating mandrel set-up the mandrel need not be moved. However, for succinct explanatory discussion, the mandrel carrying the wound thermoplastic material is moved to a holder means 16. The specific structure relative to said holder means 16 will be taken up below. In the meantime attention is directed to FIG. 3 for a review of said holder means 15 carrying the wound mandrel now identified by reference number 11a. The mandrel with the wound thermoplastic material is again positioned so that the two longitudinal slots are facing upwardly towards said movable pucturing, and heat sealing device 17 which has approximately the same length as the wound mandrel 11a. Along the bottom portion directing downwardly from said puncturing and heat sealing device 17 is a double row of teeth 18 having a comb-like configuration which are heated teeth and are in a setoff manner. They are positioned so that as the puncturing and heat and sealing element 17 carrying said teeth 18 is moved downwardly towards the wound mandrel 11a they puncture the wound thermoplastic material and enter the slots 11b and 11c. Since the teeth are heated they not only puncture the thermoplastic material but also effect a heat seal around the apertures produced by the teeth. It will be appreciated that the reinforcing element must have been previously positioned accurately on the said ridge 15 so that it does not come in the way of the penetrating and heat sealing teeth 18 of the moving puncturing and heat sealing element 17. The dwell time for this puncturing and heat sealing step is relatively short encompassing only a few seconds. Of course, this can be varied depending upon the temperature gradients of the device. After the heat sealing step has been accomplished the device 17 is withdrawn and returns to its normal position.

Figure 4:
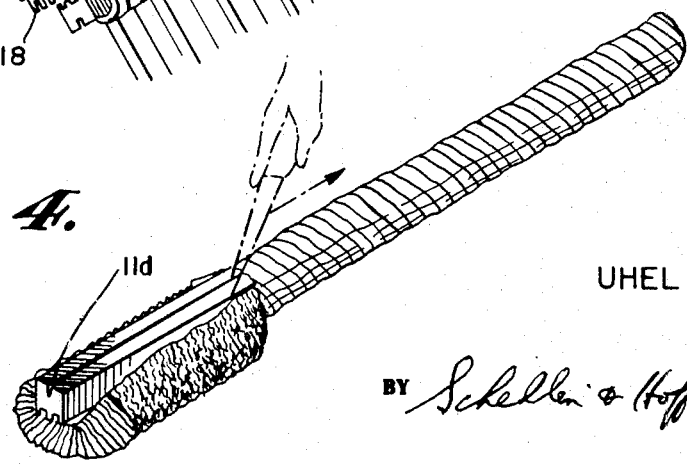
FIG. 4 is the fourth step in producing the article of the present invention.

After the puncurting and heat sealing step the following step as indicated in FIG. 4 is the important cutting or slicing step. The mandrel 11a is then transferred to yet another location as shown in FIG. 4. In this instance the mandrel is turned so that the single longitudinal slot 11d is positioned upwardly. An operator with a knife 9 then slices longitudinally the heat sealed, punctured and wound thermoplastic material by using slot 11d as a guide means during the slicing operation. After the cutting operation has been completed the wound thermoplastic material will have been freed from mandrel 11 and by suitably shaking the twisted helically wound thermoplastic materials project radially from the center core comprising the heat sealed portion enveloping the reinforcing element 13 if such has been included. The resultant product is exemplified by FIG. 5.

While it has been stated in conjunction with the fourth manipulative step of the instant matter that the wound mandrel after the puncturing and heat sealing operation is to be moved to another position, a slicing means could be positioned in operative relationship with the mandrel after the heating step to accomplish the cutting of the thermoplastic material as indicated without further prior displacement. It has also been discovered that it is a wise policy to undertake the cutting or slicing operation at a time when the thermoplastic material is relatively warm after the puncturing and heat sealing operation.

In reiteration, it will be noted that the invention includes four distinct operative or manipulative steps when a reinforcing element is employed. However, when the reinforcing element is not employed, then the invention partakes of three distinctive steps. Consequently, in conjunction with the puncturing and heat sealing operation it has also been found that the puncturing step may be eliminated in those situations where adequate heat sealing can be accomplished throughout the area in a radial manner. For instance, it is contemplated heat sealing may be accomplished by Radio Frequency means thereby eliminating the need for a puncturing step. Puncturing, in other words, is utilized to bring the heat sealing teeth elements 18 into operative heat radiating position, that is in juxtaposition with the thermoplastic materials all the way through from the top into the inner recesses thereof. If the layers of wound thermoplastic layers are relatively thin it will be less necessary to include the puncturing step.

This preliminary discussion relative to the production of the articles of the present invention, is deemed to be informative and is particularly necessary when reviewing the specific apparatus of the present invention for accomplishing the steps of producing the article of FIG. 5. This understanding should alleviate any further problems in regard to the apparatus which will now be considered in specific detail.

In the foregoing no particular information was imparted as to the nature of the thermoplastic material. Most desirable for the practice of the present invention is the use of polyethylene having a one mil thickness. It is well known that polyethylene as well as most thermoplastic materials may be brilliantly colored, the use of colored thermoplastic strips will certainly enhance the ornamental qualities of the resultant. Further, by employing a plurality of different colored thermoplastic strips at the same time a variegated object is obtained.

By employing two carriages for distributing the thermoplastic material strips it is possible to obtain two tone effects. The first carriage is positioned in the usual manner while the second is positioned midway of the mandrel. The color of the strips supplied by means of the first carriage may be of one type while the color of the strips supplied by means of the second carriage may be of another type. The carriages when operated move only one-half of the usual distance during a pass so that the color types are kept separate.

Accordingly, attention is now directed to FIGS. 6, 7 and 8 for a general understanding of the apparatus desirable to produce the wound mandrel 11a mentioned in the above.

Specifically, the means for winding mandrel 11 is based somewhat on the concept of a lathe. The winding apparatus, shown generally by reefrence numeral 8, is positioned on a worktable shown generally by reference numeral 21. The worktable has two front legs 22a and 22b and two rear legs 22c and 22d; and a horizontal table surface 23. FIG. 6 shows a front or operator's view of the device 8 for accomplishing the winding technique. As was stated, FIG. 7 is the left side view of this device 8 and FIG. 8 is the right side view thereof. It will be noted from FIGS. 7 and 8 that the rear legs 22c and 22d extend upwardly as standards for carrying for instance, the mentioned moving carriage 61 and for securing thereto suitable horizontal shelf means 31 for retaining a plurality of spools 32 of thermoplastic material. It will be noted from the FIGS. 7 and 8 that the spools 32 are supported so that they have their respective axes in a vertical position. Of assistance to this instant matter is the fact that by retaining the spools in this position a twist is guaranteed as it is played from the spool 32 to the mandrel 11. The support means 32 may, of course, be positioned at a lower level than shown in FIGS. 7 and 8. As a matter of fact, in a number of instances the spools have been positioned on the workfloor directly in back of the apparatus 8.

The mandrel 11 is positioned between what might be called a tailstock and a headstock if the device was strictly characterized as a lathe. Carrying the analogy further, the so-called tailstock 41 consists of a spring loaded holding means 42 which accepts the load of mandrel 11 when it is pushed into socket 43. Following this the mandrel 11 is given an additional push to the left to overcome the action of spring 44 so that the mandrel 11 can be moved into socket 45 at the other end thereof in what could be known as the headstock 45. The holder portion of the tailstock 45 is suitably journaled so that it and the mandrel can be rotated. The tailstock 45 is a generally U-shaped assembly having upwardly extending legs 47 and 48. In the headstock 46, again, suitable journals 49 and 50 are positioned in upwardly extending support means 51 and 52 which is attached to the table surface 23. Driving means is provided by a driven pulley 53 which is suitably keyed to stub axle 54 and is driven by means of belt 55 through a pulley 56 which is splined to an axle 57 which is directly rotated by suitable prime motive means which is usually an electric motor (not shown). A switch 58 is positioned on the right forward leg 22b for turning the motor on or off. Positioned in back of the mandrel rotating and holding portion of the apparatus 8 and slightly above this portion of the device is a horizontally movable carriage shown by reference numeral 61. The carriage 61 is mounted on a trackway 62 and is pulled by cable 63 which is pulled to the left and passes over suitable driving means and then in an endless manner to the end, that is, to the right of the device around a pulley 64 and again to the carriage 61. In regard to carriage 61 and the track means therefor, attention is directed to FIG. 8 where a portion of the apparatus has been broken away to reveal a single track 62. The carriage 61 is carried on track 62 by small flanged wheels 65, there being four in a number with two on the bottom and two on the top of track 62.

In regard to the driving means for the carriage 61, that portion of the apparatus 8 applicable is shown in an enlarged view in FIG. 9. Driven belt 71 drives a pulley 72 which is keyed to an axle 73. This axle is in operative condition with suitable gear reduction means located in a housing 74. The housing 74 is suitably mounted on a plate 75 which in turn is mounted on cross member 76 secured between the upright standards 22c and 22d of the back legs of the device. An axle 77 extends from the gear reduction housing 74 and a pulley 78 is suitably keyed thereto. An endless belt 79 extends vertically around idling pulley 80 and then upwardly towards driven pulleys 81 and 82. Suitable journaling means can be found for driven pulleys 81 and 82 by means of journals 83 and 84. Suitable mounting means is, of course, utilized as shown by reference numerals 85 attached to upright standard 22c and track 52 which also acts as a support as shown in FIG. 9. The enlarged portion as shown in FIG. 9 can also be seen quite clearly in FIG. 6. However, in FIGS. 7 and 8 the carriage moving means is hidden from view by the upright standards 22c or 22d except for, for instance, a portion of the gear reduction housing 74 and pulley 72 which can be seen jutting out from the back of the device.

Carriage 61 carries on the upper surface thereof a block 91 which at the start of the operation is in abutment with downwardly extending plate 92 which is secured to a horizontally disposed reciprocating arm 93. The arm 93 has sliding holding means 94 at either end which reciprocally slide on horizontally disposed element 95 located above arm 93. Said sliding holding means 94 strike against one or the other of microswitches 96 at the right side or 97 at the left end. The microswitches 96 and 97 are secured to the standards of legs 22d and 22c, respectively. At the other end microswitch 97 is open. The carriage 61 carries a guide plate 12 through which the thermoplastic material is played. Attention is directed to FIG. 10 for a more detailed view of guide plate 12 which has a plurality of orifices 12a into and through which a thermoplastic material is twisted and fed therethrough as can be seen from 12b.

As the carriage moves from right to left it comes to rest against the other abutment plate 92 as can be seen from the dotted lines of carriage 61. As it moves into abutment with plate 92 the reciprocating arm 93 moves to the left thereby closing microswitch 97 and opening microswitch 96 at which time the carriage stops and the mandrel 11 stops rotating. A two-pole switch 58 is utilized to again activate the two motors that operate the mandrel and the carriage. When a reinforcing element is employed and the carriage has moved to the left as shown in dotted lines in FIG. 6 the reinforcing wire, if such is employed, is positioned as indicated heretofore or a length of reinforcing tape is unreeled from spool 101 as shown in dotted lines as being mounted at the right of the apparatus 8.

After the reinforcing element has been positioned or no reinforcing element is utilized the apparatus is turned on again by means of switch 58 and the carriage 61 again moves to the right in accordance with the invention as mentioned in the above. After the completion of the return run the tapes are cut just above the mandrel and below the guide plate means 12.

The mandrel 11a is then moved to a holder shown generally by reference numeral 121 as can be seen from FIG. 11. The holder is mounted on a worktable. FIG. 12 should also be considered in conjunction with FIG. 11. FIG. 11 is a front view as the operator sees the holder 121 and FIG. 12 is a side view thereof with another similar holding area on the other side for another operator. Specifically, in regard to the holder 121 which consists of spaced bars 122 which are parallel to one another and extend upwardly away from the operator. Similarly, bars of like type are positioned at the other side so that together bars 122 describe an inverted V as can be seen from FIG. 12. The bars are useful in that retainers 123 are located along the bars and are adjustably and slidably secured by means of suitable set screws 124 in each retainer 123. It will be noted that a wound mandrel 11a is positioned to lie against extending bars 122a and against retainers 123. The retainer 123 by being vertically adjustable provide for mandrels of varying sizes. The bars are suitably supported by means of upright standards 129 at either end which in turn are secured to a worktable having suitable legs 125 and 126 as can be seen from FIG. 11 with legs 127 and 128 therebehind. A flat working surface at the front is shown by reference numeral 129. The puncturing and heat sealing means 17, previously mentioned is divided into two main components. A heating means 131 having a rectangular and longitudinal configuration is positioned on either side of the holder 121 above and spaced from the retainer 123. Extending downwardly from the heating means 131 are combs 18 with teeth-like elements 18a. The heating means is suitably connected to an electric supply and the heat is provided by conventional heat resistance wires embedded in the heating means 131.

Air cylinders 132 are illustrated to show operating means through suitable rods 133 of each of the air cylinders to which the puncturing and heat sealing means 17 is affixed. By providing air under pressure to the air cylinders the said means 17 is carried downwardly parallel to said bars 122 towards the wound mandrel 11a to move the teeth into penetrating relationship of the thermoplastic material on wound mandrel 11a.

For a closer inspection of the assembly, attention is directed to FIGS. 13 and 14. It will be noted from FIG. 13 that puncturing and heat sealing means 17 with the extending combs 18 is shown in a penetrating position in regard to the thermoplastic material on wound mandrel 11a. The wound mandrel 11a is resting on a retaining element 123. It will be appreciated that a portion of the wound mandrel 11a and the puncturing and heat sealing means 17 is shown. For an even clearer rendition of the manner in which the teeth 18a penetrate attention is directed to cross sectional view of FIG. 14 which is taken along lines 14—14 of FIG. 13. It will be noted that in FIG. 14 no reinforcing element is shown to be positioned on the ridge 15.

Attention is now directed to embodiment of that part of the instant concept devoted to an apparatus, generally 150, for effecting a simultaneous puncturing and heat sealing of the wound mandrel 11a. Specifically, attention is directed to FIGS. 15, 16 and 17, which should be read together. In place of the parallel bars of the first embodiment for holding the wound mandrel 11a the mandrel 11a is positioned in a device having a reciprocating movable horizontally positioned bar 151. Attached to the bar 151 are a plurality of upwardly extending bifurcated members 152 into which is positioned the wound mandrel 11a. Bar 151 is slidably mounted by guide means 153 which includes a housing 153a positioned at both ends of bar 151. The housing has a tubular vertical bore 153b for guide rods 154. The bar 151 and its associated guide means is mounted by means of perpendicularly extending plates 155 at either end of the apparatus 150 which are secured to vertical standards 156. The upright standards 156 are connected at the top portion by a crossbar 157 and by a bar at the bottom portion shown by reference numeral 158. Secured to the lower bar are air cylinders 159 which have rod connections 160 to the bar 151 so that bar 151 may be reciprocated by action of the air cylinder. Depending downwardly from crossbar 157, by means of suitable extensions 161 is a puncturing and heat sealing element 17a which is similar in construction to the puncturing and heat sealing element 17 of the other embodiment. The puncturing and heat sealing element 17a is heated by electric resistance means positioned internally thereof as heretofore. Further, combs 18 depend from the puncturing and heat sealing element 17a as before. However, in place of having the puncturing and heat sealing element move downwardly as before the mandrel carrying bar 151 moves upwardly as better seen from the cross section views of FIG. 16 and FIG. 17. Both of the cross sectional views of FIGS. 16 and 17 are taken along lines 16—16 of FIG. 15. In FIG. 16 the wound mandrel 11a is in position for movement upwardly as is accomplished in FIG. 17.

The air cylinders 159 are activated by valve assembly 162 which is secured to crossbar 157 for convenience.

For a further clearer understanding of the teeth arrangement of the combs 18 utilized in the present invention, attention is directed to FIG. 18 from whence can be seen the two combs 18 utilized in spaced relationship in puncturing and heat sealing element 17. The combs include teeth 18 which are setoff one from the other as indicated. In FIG. 19 a single tooth 18a is illustrated which is a partial cross sectional view taken along lines 19—19 of FIG. 18. From this it can be seen that the teeth have a bevel 18b on both sides.

Figure 20:
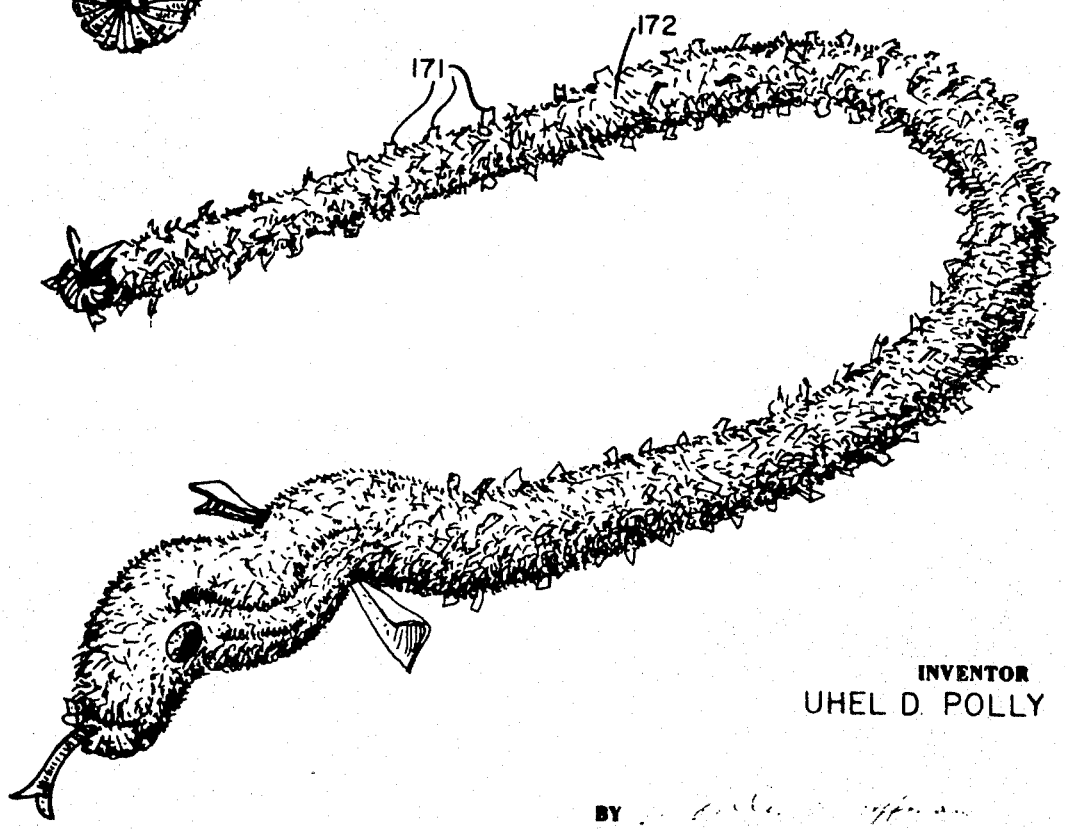
FIG. 20 is a top perspective view of the snake showing a body portion produced as another embodiment of the present invention.
Figure 21:
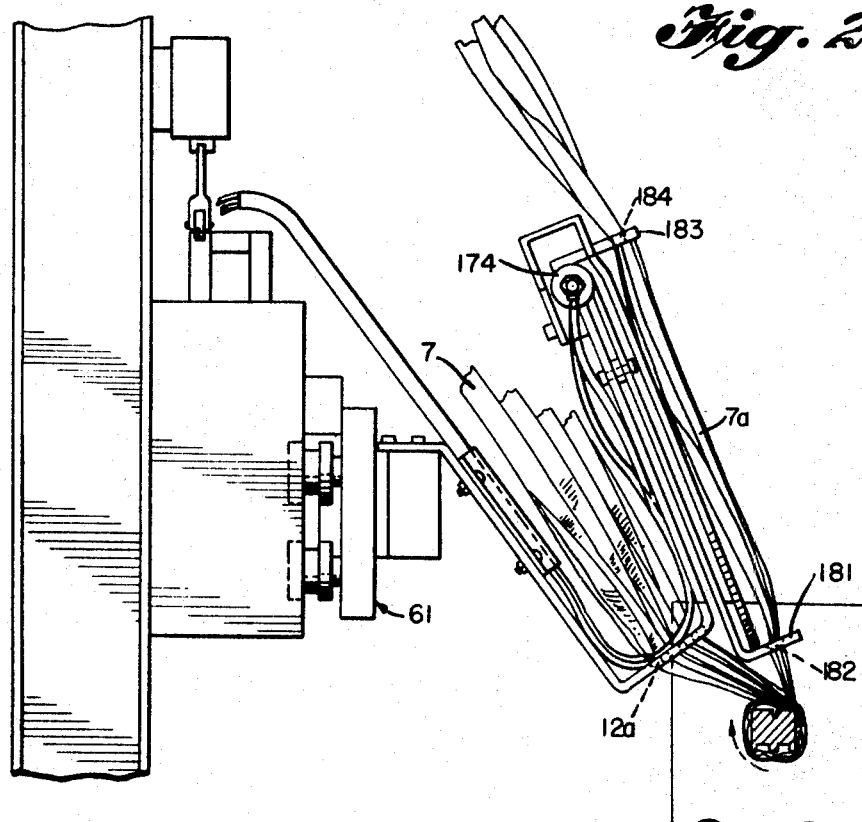
FIG. 21 is a side view of the attachment utilized in constructing the body portion of the snake of FIG. 20.
Figure 22:
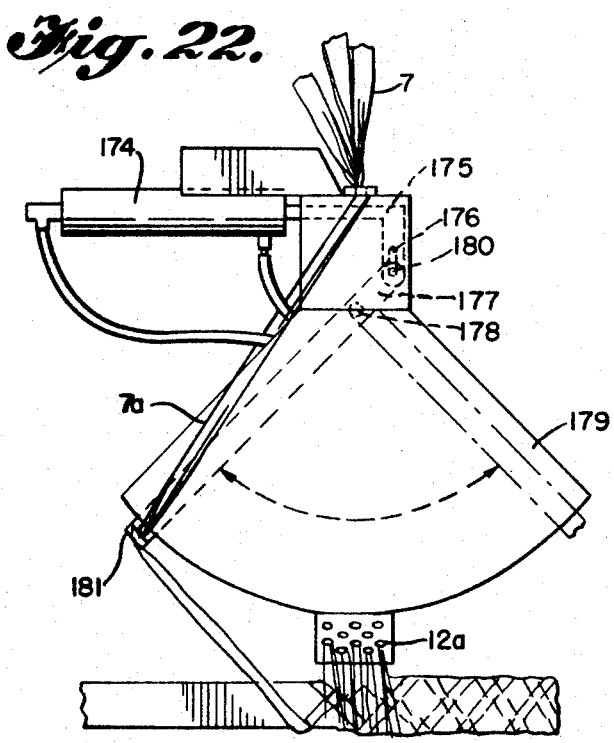
FIG. 22 is a front view of the attachment of FIG. 21.
Figure 23:
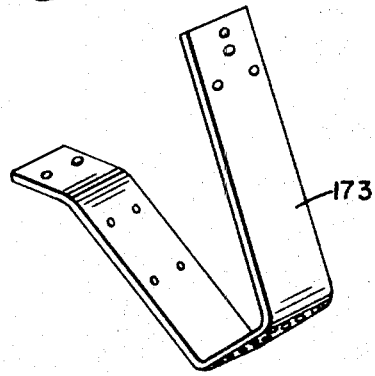
FIG. 23 is the plate utilized for attaching the attachment shown in FIG. 21.

In the previous discussions undertaken in connection with the present invention, the mandral 11 is covered with a plurality, in most instances, of twisted strips of thermoplastic material. Under certain conditions in order to provide an unusual design configuration, it has been found desirable to produce a configuration wherein certain portions of the thermoplastic material extends radially beyond the main body portion thereof. In other words, in the embodiment shown in FIG. 5 the outward surface represented is relatively smooth insofar as by and large the thermoplastic material extending radially from the heat sealed portion is of relatively equal length. In FIG. 20 there is a change in that every so often one can see thermoplastic strips 171 which extend beyond the body 172. In order to accomplish this variegated article, a special attachment must be secured to the moving carriage 61. Therefore, attention is now directed to FIGS. 21–23, which should be read together. First of all, a bracket 173 of the type and configuration shown in FIG. 23 is utilized by being secured on the front of carriage 61 as shown in FIG. 21 which is a side elevation. Bracket 173 takes the place of guide means 12 inasmuch as at the apex portion of the U-shaped bracket holes are drilled therethrough.

Figure 24:
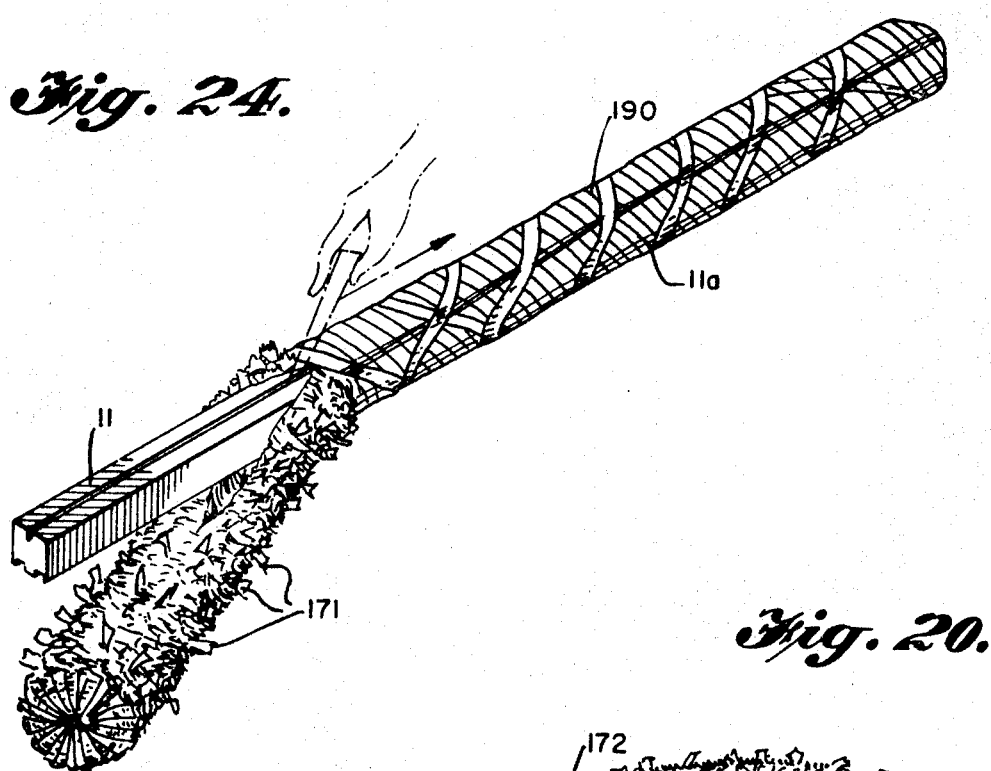
FIG. 24 is a perspective top view of a wound mandrel produced by utilizing the attachment of FIG. 21.

These holes are presented by reference numeral 12a and take the place of the holes in guide means 12 of the previously discussed embodiments. On the upper surface of bracket 173 an air cylinder motor 174 is positioned which operates to reciprocate rod 175. Rod 175 has an L-shaped configuration as can be seen from the dotted lines in FIG. 22. A slot 176 is located in the short leg of the L-shaped rod 175. A level 177 is pivotally mounted at 178 behind a pie-shaped plate 179. The lever is pivotally mounted to bracket 173 and describes an arcuate motion as rod 175 reciprocates due to a stub means 180 which rides in slot 176 to rise and fall in said slot and thereby effect a pendulum like swing on the part of lever 177. Lever 177 has a portion extending towards the operator wheel and is perpendicular to the lever 177 at a point below said plate 179 so that it extends outwardly beyond plate 179. This portion is identified by reference numberal 181. The portion 181 has at least one aperture 182 therethrough through which at least one twisted thermoplastic strip 7a may be passed and guided therethrough, and on to the mandrel 11. The thermoplastic material which may consist of more than one strip also passes through guide means plate 183 having an aperture therethrough 184. The air cylinder is connected to suitable hose connections shown by reference numerals 185 and 186. Inasmuch as the special attachment is secured to the carriage it will be seen that as the thermoplastic strips are fed through the holes 12a and onto the mandrel thermoplastic material will also be fed through lever portion 181. Due to the reciprocation of lever 177 it will be seen that as the carriage moves longitudinally a portion of the thermoplastic material will be wound at a different angle from that being fed from the relative static guide means through apertures 12a, static only with respect to said moving lever 177. The resultant will be that a larger angle with respect to the vertical will be produced on the part of the wound thermoplastic strips as the bar moves from the center line to the left due to the fact that it is moving faser than the carriage and then will actually reverse and overlap as the lever 177 goes from the right of the center line to the far right. The resulting view will be as shown in FIG. 24 where the mandrel 11a has been covered with wound thermoplastic strips in a helical manner with an overply consisting of additional strips at a greater angularity shown by reference numeral 190. Inasmuch as the angularity of strips 190 is different than the majority of helical wound strips, the strips 190 will in effect be radially longer than the other helical wound thermoplastic strips so that they will extend beyond the majority as shown in FIGS. 20 and 24 and are identified as reference numeral 171. The degree of angularity from the vertical is dependent upon the degree of arcuate swing of lever 177, and on the period of the lever in relation to the linear speed of the carriage.

Figure 25:
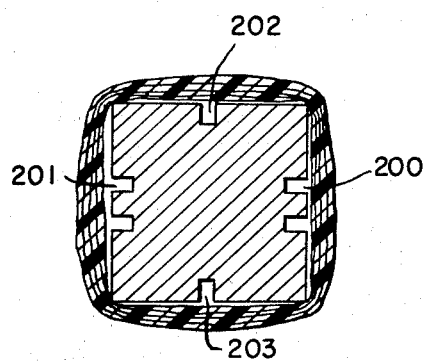
FIG. 25 is a cross-sectional view of an embodiment of another mandrel utilized in the present invention.

Turning to FIG. 25, a cross-sectional view of a mandrel is represented which is useful in producing two separate items of the type of FIG. 5 from a single wound mandrel. In other words, by heat sealing the plastic material at zones 200 and 201 as shown in FIG. 25 it is possible to produce a double unit of the type of FIG. 5 when cuts are made along slots 202 and 203 simultaneously after the heat sealing has been accomplished. Obviously, to carry such a device forward to fruition it is necessary to provide a double heating unit concept which heat seals and/or punctures both zones 200 and 201 relatively simultaneously to get maximum effect. However, one could employ a single heat unit of the type disclosed in the instant embodiments by turning the mandrel over after say, for instance, zone 200 has been punctured and heat sealed so that then subsequently thereto zone 201 may be heat sealed and punctured.

Figure 26:
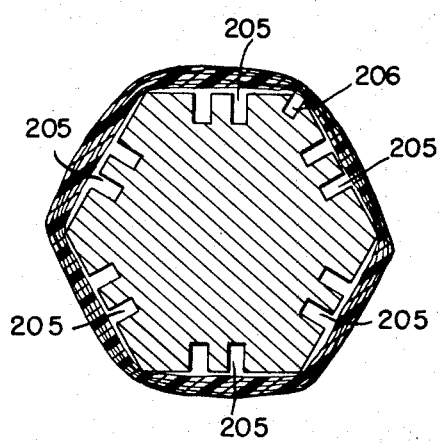
FIG. 26 is a cross-sectional view of still another embodiment of a mandrel of the present invention.
Figure 27:
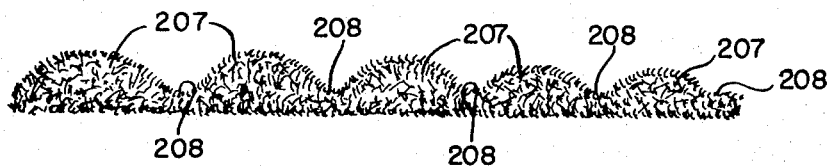
FIG. 27 is a view in side elevation of an article produced by using the mandrel of the embodiment of FIG. 26.

In FIG. 26 it is possible to discern in cross-sectional view yet another type of mandrel which lends itself admirably to producing a rug-like resultant. Specifically, the mandrel has a cross-sectional polygonal shape whereby a number of heat sealing zones are located shown by reference numerals 205 and a single corner cutting slot 206 where the wound mandrel is cut so that as the wound material is unfurled a carpet-like effect is produced having a general configuration in side elevation as shown in FIG. 27, having raised arcuate extended portions shown by reference numeral 207 and heat sealed areas shown by reference numerals 208.

Figure 28:
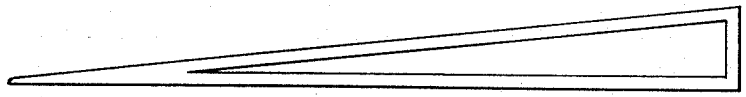
FIG. 28 is a side view of another embodiment of a mandrel of the present invention.
Figure 29:
FIG. 29 is a side view of an article produced by using the mandrel of the embodiment of FIG. 28.

In the embodiments discussed in the above, discussion has been undertaken primarily in conjunction with mandrels having constant cross-sectional dimensions from one end to the other. In a situation where it is desirable to form a final product having different outward contours, one must employ a mandrel which has a variable cross-sectional configuration. For instance, if a pyramidal final product is desired the contour would have a general right triangle configuration so that it would be thicker at one end and less thick at the other. By using a right triangle configuration the heat sealing would still be accomplished along a smooth flat surface parallel with the axis of the mandrel. After cutting the unfurling would produce the pyramidal shape for purposes such as small Christmas trees. In FIG. 28 one can discern a mandrel useful for the purpose intended and in FIG. 29 a Christmas tree of pyramidal shape is shown.

Figure 30:
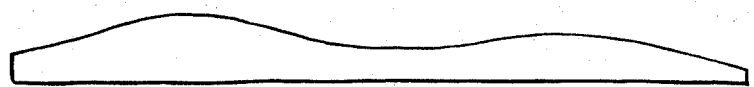
FIG. 30 is a side view of still another embodiment of a mandrel of the present invention.

In the instance where the apparatus of the present invention is to produce a resultant having a thickened portion followed by a thinner portion and then again a thicker portion as shown in the head section of FIG. 20 of the snake, the mandrel must have configuration somewhat as shown in FIG. 30. Again, the bottom portion is flat with slots therein so that the regular heat sealing arrangement can be used. At the same time, due to the ingenious first embodiment heat sealing apparatus the retainer means 124 may be readily adjusted to support the convoluted mandrel of the type shown in FIG. 30.

Other embodiments will come to mind from a reading of the above. Only the limits of the individual's imagination will limit the attractive, useful ornamental objects which may be produced by practicing the method of the instant invention and utilizing the apparatuses disclosed herein.

What is claimed is:

1. An apparatus for helically winding a plurality of twisted strips of thermoplastic material onto a mandrel comprising in combination a frame, a rotatable mandrel mounted on said frame and adapted to receive and to rotate a plurality of long lengths of a plurality of strips of thermoplastic material, reciprocable carriage means, elongated longitudinal means adapted to support and reciprocate said carriage means, said elongated longitudinal means mounted on said frame with its longitudinal axis extending substantially parallel to the longitudinal axis of said mandrel, guide plate means having at least one aperture for a strip of thermoplastic material to pass therethrough mounted on said carriage means parallel to said mandrel and between said mandrel and said elongated longitudinal means, transmission means operatively interconnecting said longitudinal means for carrying said carriage and said mandrel whereby the mandrel is rotated and the elongated longitudinal means reciprocates longitudinally said carriage means, drive means on said frame adapted to operate said transmission means, pendulum means attached to said carriage, said pendulum means on said carriage means having a pendulum, said pendulum means having motive means adapted to swing said pendulum in an arcuate manner whereby thermoplastic strip material is supplied to said mandrel.

2. Apparatus for winding puncturing and heat-sealing overlapping thermoplastic strip material onto an elongated mandrel means for helically winding a plurality of twisted strips of thermoplastic material onto a mandrel; a frame adapted to support said mandrel in a horizontal position, means secured to said frame for holding two elongated comb-like means having teeth offset from one comb to the other and parallel to one another, means to heat said combs, said means holding said comb-like means adapted to move said comb-like means in the direction of said wound mandrel whereby the teeth of said teeth penetrate said wound thermoplastic material and thereby heat-seals that portion of the thermoplastic material which is around the teeth.

References Cited

UNITED STATES PATENTS

| | | | |
|---|---|---|---|
| 3,230,123 | 1/1966 | Christensen | 156—195 |
| 3,300,356 | 1/1967 | Warnken et al. | 156—194 X |
| 3,401,073 | 9/1968 | Wood | 156—195 X |
| 2,938,566 | 5/1960 | Toulmin | 156—431 X |
| 3,056,223 | 10/1962 | Crane | 41—15 |
| 3,140,970 | 7/1964 | Reukauf | 156—425 |
| 3,580,783 | 5/1971 | Glaze | 156—429 X |

CARL D. QUARFORTH, Primary Examiner

G. G. SOLYST, Assistant Examiner

U.S. Cl. X.R.

156—193, 194, 195, 251, 432